United States Patent [19]

Ihler et al.

[11] Patent Number: 4,580,903
[45] Date of Patent: Apr. 8, 1986

[54] AUTOMATIC DOUGH PARTING AND KNEADING MACHINE

[75] Inventors: Hansjörg Ihler, Brigachtal; Gerhard Huber, Bad Dürrheim; Hermann Oksas, Villingen-Schwenningen, all of Fed. Rep. of Germany

[73] Assignee: Fr. Winkler KG Spezialfabrik fur Backereimaschinen und Backofen, Villingen, Fed. Rep. of Germany

[21] Appl. No.: 614,813

[22] Filed: May 29, 1984

[30] Foreign Application Priority Data

May 31, 1983 [DE] Fed. Rep. of Germany ....... 3319666

[51] Int. Cl.$^4$ ............................ B28C 7/02; B28C 7/04
[52] U.S. Cl. .......................................... 366/76; 366/91; 366/92
[58] Field of Search ....................... 366/69, 70, 71, 72, 366/73, 76, 77, 91, 92, 349, 348

[56] References Cited

U.S. PATENT DOCUMENTS

| | | |
|---|---|---|
| 3,225,714 | 12/1965 | Gaskell . |
| 3,547,053 | 12/1970 | Mueller . |
| 3,733,058 | 5/1973 | Konig ..................... 366/76 |
| 3,990,685 | 11/1976 | Balaguer ................ 366/69 |
| 4,013,275 | 3/1977 | Schroder ............... 366/76 |
| 4,124,305 | 11/1978 | Benier ................... 366/69 |

FOREIGN PATENT DOCUMENTS 1080041 4/1960 Fed. Rep. of Germany .

Primary Examiner—Robert W. Jenkins
Attorney, Agent, or Firm—Leonard Bloom

[57] ABSTRACT

An automatic dough parting and kneading machine has at least one channel between the parting chamber and the kneading apparatus. Means are provided to periodically and selectively raise the kneading apparatus into at least partial telescopic engagement with the channel. Thereafter, the kneading belt (on which the pieces of dough are carried) is periodically advanced.

12 Claims, 5 Drawing Figures

AUTOMATIC DOUGH PARTING AND KNEADING MACHINE

FIELD OF THE INVENTION

The invention relates to an automatic dough parting and kneading machine in which one or more channels are disposed above the kneading apparatus, which receive the pieces of dough from the parting chambers after they have been expelled and deliver them through the channel apparatus to the periodically moved kneading apparatus.

BACKGROUND OF THE INVENTION

In the known automatic dough parting and kneading machine according to German Pat. No. 10 80 041, the channel apparatus is connected with the kneading apparatus in such a way that during the kneading process an expulsion and scraping off of the pieces of dough and a subsequent transfer thereof into the channel apparatus takes place. The expelled pieces of dough that are being kneaded are prevented from coming together by means of an interposed collecting flap inside the channel apparatus. In this dough parting and kneading machine, the vertical and spirally circling movements of the channel apparatus must be made together with the collecting flap and the drive mechanisms, so that the masses that must be moved limit the output per cycle. Sticking also causes problems at the collecting flap, because the pieces of dough always drop onto the same bearing surfaces.

OBJECT AND SUMMARY OF THE INVENTION

Accordingly, it is an object of the present invention to alleviate the deficiencies and disadvantages of the prior art by providing a channel means between the piece of dough and the kneading apparatus, which channel means is preferably stationary. After being expelled from the measuring chambers, the pieces of dough are delivered via the channel means directly to the kneading apparatus, without an intervening collecting flap. As a result, interruptions caused by sticking are avoided, and the mass of the kneading apparatus is reduced considerably, thereby enabling an increase in the output of the kneading apparatus.

Because of the synchronized adjustment of the dough parting apparatus relative to the kneading apparatus and its movement, the pieces of dough are guided uninterruptedly from the expulsion point until they are deposited into the kneading apparatus via the channel means, resulting in a satisfactory transfer into the pre-kneading cup or cups.

In accordance with the teachings of the present invention, there is herein disclosed an improved automatic dough parting and kneading apparatus in which a parting means is adapted to receive a substantially measured quantity of dough, and in which a channel is disposed below the parting means for receiving the measured dough quantity (or quantities). A scraping means is provided between the parting means and the channel to preclude substantial pieces of dough from sticking to the parting means. A kneading belt is disposed below the channel to receive the quantity of dough. A kneading cup means is disposed between the channel and the kneading belt; and means are provided for selectively raising the kneading cup means and advancing the kneading belt to advance the dough quantities, the kneading cup means being lowered after the kneading belt advances.

In accordance with the further teachings of the present invention, the kneading cup means includes a pre-kneading cup which is selectively brought into partial telescopic engagement with the channel. The kneading cup means further includes a plurality of substantially interchangeable kneading cups which, together with the pre-kneading cup, are mounted on a kneading cup carrier frame. The center-to-center distances between the channel, the pre-kneading cup, and the kneading cups may be adjusted. Preferably, the parting means includes a rotatably-mounted parting chamber roller adapted for alternate clockwise and counterclockwise pivotal movement, and the scraping means includes a scraper shaft adapted for counterclockwise rotation relative to the pivotal movement of the parting chamber roller.

These and other objects of the present invention will become apparent from a reading of the following specification, taken in conjunction with the enclosed drawings.

DESCRIPTION OF THE PREFERRED EMBODIMENT

Figure 1:
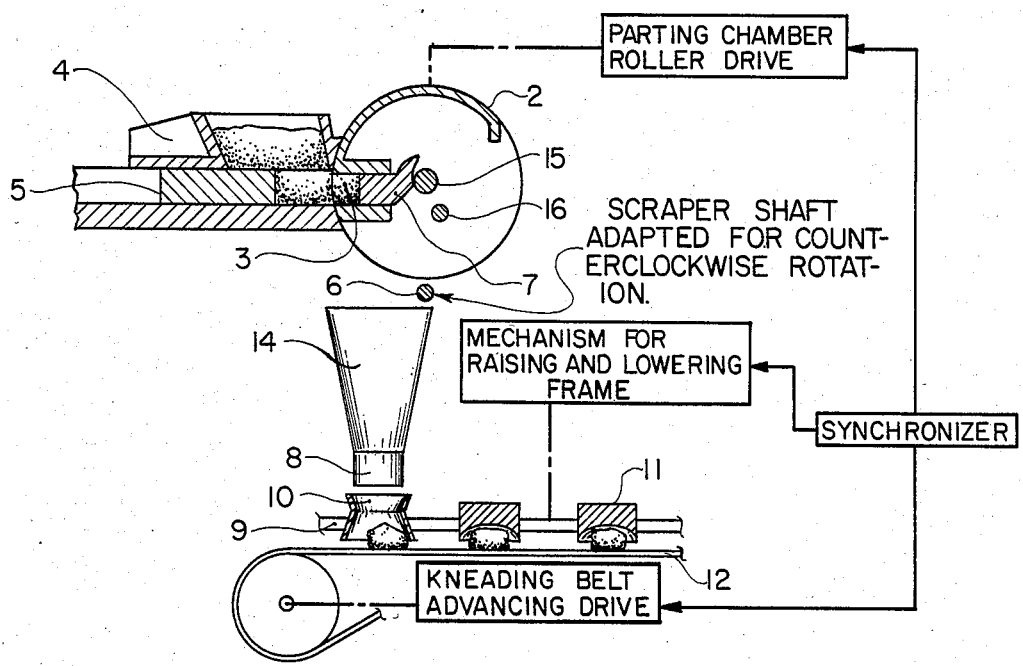
FIG. 1 shows the principle of a dough parting apparatus with a following wiper device, channel apparatus and kneading apparatus disposed beneath it, wherein the filling process of the measuring chambers and the kneading process are shown taken place, a parting chamber roller drive, a mechanism for raising and lowering frame, a kneading belt advancing drive and synchronizer being shown diagrammatically.
Figure 3:
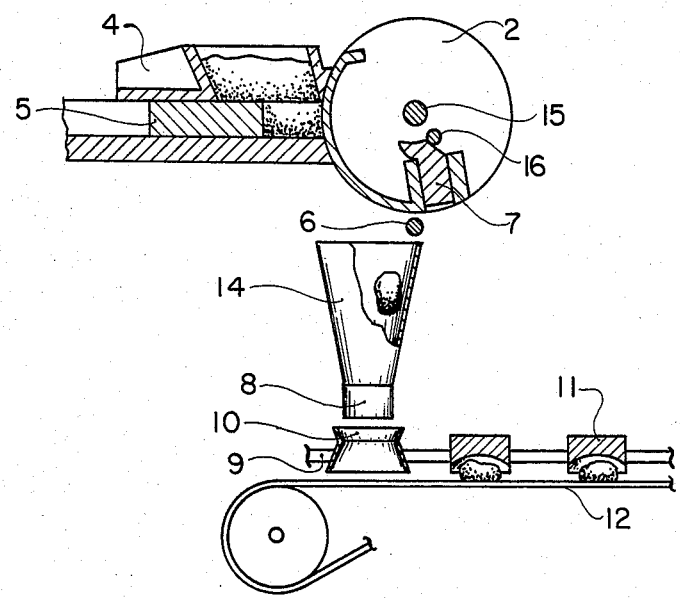
FIG. 3 shows the situation after the pieces of dough have been scraped off and the pre-kneading cups have been lowered to the kneading belt, so that an uninterrupted guidance of the pieces of dough takes place.
Figure 4:
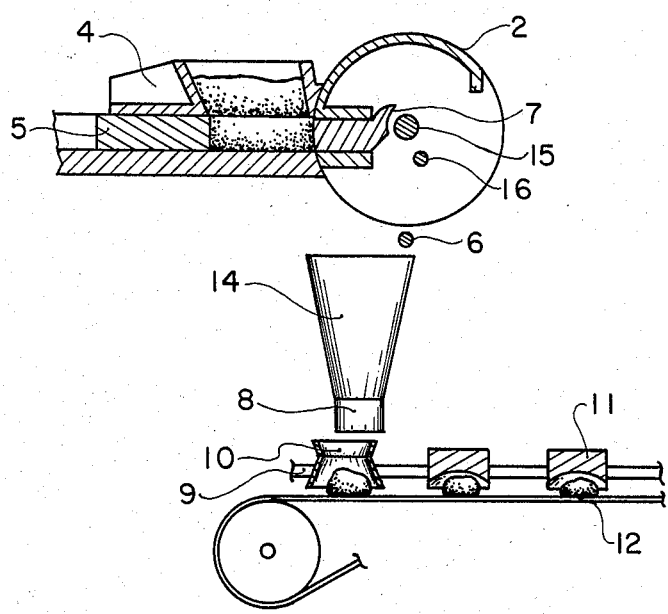
FIG. 4 shows the situation of readiness for refilling of the measuring chambers during the kneading process.
Figure 5:
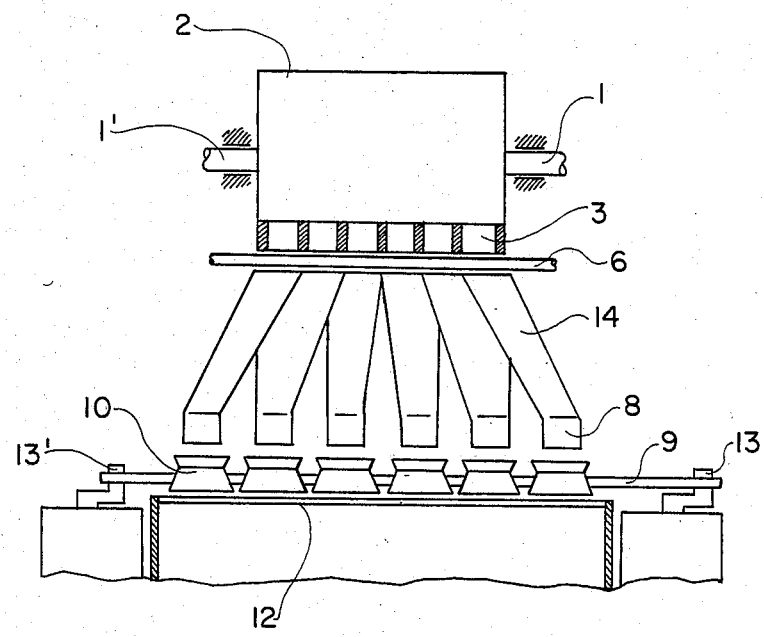
FIG. 5 illustrates in principle the front view of FIGS. 1-4.

The dough parting apparatus of the machine, in the illustrated exemplary embodiment, has a parting chamber roller 2 having individual parting chambers 3 and pivotably supported at 1 and 1' (see FIG. 5). A portion of the supply of dough located in a funnel 4 is filled by means of the main piston 5 into each of the individual chambers 3. Once the parting chambers 3 are filled, the parting chamber roller 2 is caused to pivot counterclockwise, as viewed in FIG. 1 whereupon the pieces of dough are expelled and scraped off from the parting piston 7 by means of the scraper shaft 6 which is likewise rotating counterclockwise that is, in the same direction as the counterclockwise movement of the parting chamber roller 2 (as viewed in FIG. 1). After the parting chamber roller 2 has reached its terminal pivoting position (FIG. 3), it is pivoted clockwise back into the refilling position (FIG. 4).

The channel apparatus 14 having an end 8 that is tubular in the lower portion is located beneath the dough parting apparatus. Beneath the end 8 is the kneading apparatus having the kneading cup carrier frame 9, in which the pre-kneading cups 10 and then the kneading cups 11 are fastened. The kneading belt 12 is located beneath these kneading cups.

The pre-kneading cups 10 and the kneading cups 11, together with the kneading cup carrier frame 9, are set into a spirally circling movement in a known manner. During the period when the kneading movement is executed, the kneading belt 12 is held stationary, so that the pieces of dough are round-kneaded in the pre-kneading cups 10 and the kneading cups 11.

During the period of round-kneading of the pieces of dough resting on the kneading belt, the filling process of the measuring chambers takes place. The measuring chambers 3 are filled with dough in that the main piston 5 presses the dough into the chambers. The parting pistons 7 are pushed back against the adjustable stop shaft 15 constituting a first stop means. By the pivoting of the parting chamber roller 2, the parting pistons 7 are brought into the expulsion position by means of the stop shaft 16 constituting a second stop means, which is disposed in a stationary manner (FIGS. 2 and 3), and which cooperates with a cam surface on the rear portion of the parting piston (as shown more clearly in FIG. 2). Thereafter, the scraper shaft 6 scrapes the portions of dough from the parting pistons 7 (FIG. 3).

Figure 2:
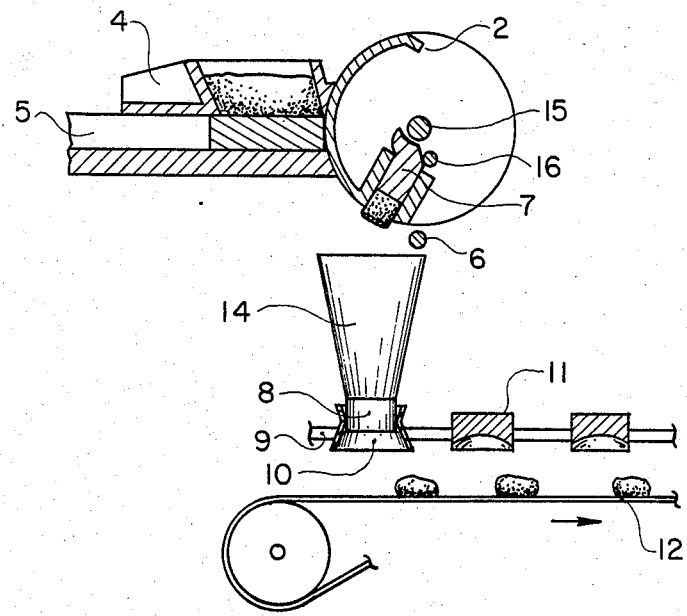
FIG. 2 shows the situation after the filling process and before the scraping process; the kneading process is ended and the kneading cup carriers are raised so that the pieces of dough can be advanced.

Once the pre-kneading of the row of pieces of dough is completed, because of the prespecified duration of kneading, then as shown in FIG. 2 the kneading cup carrier frame 9 is raised, so that subsequently the kneading belt 12 advances the row of pieces of dough by an increment of one interval between rows in the direction of the arrow, that is, from the pre-kneading zone where the pre-kneading cups 10 are located into the kneading zone of the kneading cups 11.

While the kneading cup carrier frame 9 is raised from the kneading belt 12, no kneading movement takes place, and so the tubular lower ends 8 of the channel apparatus 14 enter into the pre-kneading cups 10 as these latter move upward (FIG. 2). During this period of time, the kneading belt 12 advances the row of dough pieces.

The kneading movement of the kneading cup carrier frame 9 is executed with known rotating eccentrics 13 and 13'; the axial zero position of the kneading eccentrics exists when the kneading eccentrics are moving upward.

The channel apparatus 14 receives the expelled pieces of dough at its upper end at predetermined intervals. The course of the channel in the channel apparatus 14 may be inclined, so that the tubular lower ends 8 may be spaced apart by a selectable distance, matching the transverse spacing between the pre-kneading cups 10. The channel apparatus 14 is easily interchangeable or adjustable for various transverse spacings, as is the receptacle for the pre-kneading cups 10 and the kneading cups 11, in terms of the transverse spacing between them.

Obviously, many modifications may be made without departing from the basic spirit of the present invention. Accordingly, within the scope of the appended claims, the invention may be practiced other than specifically disclosed herein.

What is claimed is:

1. In an automatic dough parting and kneading apparatus, the combination of parting means for receiving a substantially measured quantity of dough, a channel below the parting means for receiving the quantity of dough, scraping means between the parting means and the channel to preclude substantial pieces of dough from sticking to the parting means, a kneading belt below the channel to receive the quantity of dough, kneading cup means between the channel and the kneading belt, and means for selectively raising the kneading cup means and advancing the kneading belt to advance the quantity of dough.

2. The combination of claim 1, wherein the kneading cup means includes a pre-kneading cup which is selectively brought into partial telescopic engagement with the channel.

3. The combination of claim 2, wherein the kneading cup means further includes a plurality of substantially interchangeable kneading cups.

4. The combination of claim 3, wherein the pre-kneading cup and the kneading cups are mounted on a kneading cup carrier frame.

5. The combination of claim 3, further including means to adjust the center-to-center distances between the channel, the pre-kneading cup and the kneading cups, respectively.

6. The combination of claim 1, wherein the parting means comprises a rotatably-mounted parting chamber roller, adapted for alternate clockwise and counterclockwise pivotal movement.

7. The combination of claim 1, wherein the scraping means comprises a scraper shaft adapted for counterclockwise rotation in the direction of the counterclockwise pivotal movement of the parting chamber roller.

8. An automatic dough parting and kneading apparatus, comprising a rotatably-mounted parting chamber roller adapted for alternate clockwise and counterclockwise pivotal movement, means for introducing a substantially measured quantity of dough into the parting chamber roller, a channel below the parting chamber roller for receiving the measured quantity of dough, a scraping shaft between the channel and the parting chamber roller and adapted for counterclockwise rotation in the direction of the counterclockwise pivotal movement of the parting chamber roller to preclude substantial pieces of dough from sticking to the parting chamber roller, a kneading belt below the channel to receive the measured dough quantities, a pre-kneading cup between the bottom of the channel and the kneading belt, a plurality of kneading cups forwardly of the pre-kneading cup, a kneading cup carrier frame for supporting the pre-kneading cup and the kneading cups, and means for selectively raising the kneading cup carrier frame and for advancing the kneading belt to advance the kneaded measured dough quantities.

9. In an automatic dough parting and kneading apparatus, wherein first means are provided for continuously producing individual pieces of dough, and wherein second means are provided for kneading the dough pieces, the improvement of a stationary channel means disposed between the first and second means and separate therefrom for transferring the dough pieces from the first to the second means, the second means including a kneading cup means, means for alternately raising and lowering the kneading cup means relative to the channel means, and means for scraping off the dough pieces between the first means and the channel.

10. The improvement of claim 1, wherein the kneading cup means includes a pre-kneading cup, and wherein the pre-kneading cup alternately enters into the channel in telescopic relationship therewith.

11. In an automatic dough parting and kneading apparatus, wherein a plurality of kneading cup means is disposed above a kneading belt, and wherein a main piston is adapted to deliver dough pieces from a dough supply funnel, the improvement which comprises, in combination, a roller pivotably supported on an axis and having at least one parting chamber formed therein, a parting piston slidably mounted within the parting chamber, means for rotating the roller to bring the parting chamber into alignment with the main piston and in timed relationship therewith for receiving a measured quantity of dough in the parting chamber and for retracting the parting piston within the parting chamber radially inwardly of the roller, a first stop means within the roller for limiting the radial inward retraction of the parting piston, means carried by the roller for precluding the delivery of additional dough once the parting chamber is out of alignment with the main piston, a second stop means within the roller and adapted to be engaged by the parting piston as the roller is rotated to cooperate with cam means on the parting piston for advancing the parting piston within the parting chamber radially outwardly of the roller, thereby expelling the measured quantity of dough in the parting chamber outwardly of the roller, a stationary channel means between the roller and the kneading cup means for receiving the measured quantity of dough expelled from the roller, and means for sequentially raising the kneading cup means into partial telescopic relationship with the channel and for advancing the kneading belt.

12. The combination of claim 11, further including means for scraping off portions of the dough from the parting piston.

* * * * *